US011845017B2

(12) United States Patent
Heffernan et al.

(10) Patent No.: US 11,845,017 B2
(45) Date of Patent: Dec. 19, 2023

(54) SYSTEMS AND METHODS FOR INTEGRATED MANAGEMENT OF ASSOCIATED GAS AND PRODUCED WATER AT OIL WELL EXTRACTION SITES

(71) Applicant: Ecopwrs LLC, Cheyenne, WY (US)

(72) Inventors: John Heffernan, Smithville, TX (US); Ted Lanpher, Half Moon Bay, CA (US); Joseph Beyers, Saratoga, CA (US)

(73) Assignee: Ecopwrs LLC, Cheyenne, WY (US)

( * ) Notice: Subject to any disclaimer, the term of this patent is extended or adjusted under 35 U.S.C. 154(b) by 0 days.

(21) Appl. No.: 17/489,330

(22) Filed: Sep. 29, 2021

(65) Prior Publication Data

US 2022/0096965 A1   Mar. 31, 2022

Related U.S. Application Data

(60) Provisional application No. 63/085,688, filed on Sep. 30, 2020.

(51) Int. Cl.
  *B01D 19/00* (2006.01)
  *B01D 1/00* (2006.01)
  (Continued)

(52) U.S. Cl.
  CPC ....... *B01D 19/0068* (2013.01); *B01D 1/0058* (2013.01); *B01D 1/0082* (2013.01);
  (Continued)

(58) Field of Classification Search
  CPC ............... B01D 1/0058; B01D 1/0082; B01D 19/0063; B01D 19/0068; C02F 1/008;
  (Continued)

(56) References Cited

U.S. PATENT DOCUMENTS 4,635,735 A    1/1987   Crownover
10,000,401 B1   6/2018   Famuagun et al.
(Continued)

FOREIGN PATENT DOCUMENTS

WO     2019143362 A1    7/2019

OTHER PUBLICATIONS

International Search Report mailed in PCT/US2021/052622 dated Jan. 11, 2022.

(Continued)

*Primary Examiner* — Renee Robinson
(74) *Attorney, Agent, or Firm* — HEA Law PLLC; Darrin Auito

(57) ABSTRACT

The present system is for integrated management of associated gas and produced water at oil well extraction sites. The system includes a controller that makes gas allocation determination (e.g., directs conditioned gas to (i) gas flare, (ii) produced water reduction system, and/or (iii) generator) when a change in conditioned gas flow is detected based on first plurality of inputs. If the conditioned gas is directed to the generator, then the controller makes an electricity allocation determination (e.g., (i) increase a data processing operating rate on a data processing server, (ii) start up idle data processing equipment, (iii) direct generated electric current to a power grid, and/or (iv) charge a storage battery) based on second plurality of inputs. By operating the system of gas consumption and electricity production/consumption in an integrated fashion, benefits of flaring prevention, resource conversation, and more efficient economic operations are optimized to a degree not previously attainable.

15 Claims, 7 Drawing Sheets

(51) Int. Cl.
*C02F 1/16* (2023.01)
*E21B 43/34* (2006.01)
*C02F 1/00* (2023.01)
*C02F 1/04* (2023.01)
*C02F 1/06* (2023.01)
*B01D 5/00* (2006.01)
*C02F 1/20* (2023.01)
*H02J 13/00* (2006.01)
*H02J 3/38* (2006.01)
*C02F 103/10* (2006.01)
*H01M 10/44* (2006.01)

(52) U.S. Cl.
CPC .......... *B01D 5/006* (2013.01); *B01D 5/0069* (2013.01); *B01D 19/0063* (2013.01); *C02F 1/008* (2013.01); *C02F 1/048* (2013.01); *C02F 1/06* (2013.01); *C02F 1/20* (2013.01); *E21B 43/34* (2013.01); *C02F 2103/10* (2013.01); *C02F 2303/10* (2013.01); *H01M 10/44* (2013.01); *H02J 3/38* (2013.01); *H02J 13/00034* (2020.01)

(58) Field of Classification Search
CPC ............... C02F 1/048; C02F 2103/10; C02F 2303/10; E21B 43/12; E21B 43/34
See application file for complete search history.

(56) References Cited

U.S. PATENT DOCUMENTS

| | | |
|---|---|---|
| 2013/0206411 A1 | 8/2013 | Zhang et al. |
| 2014/0014492 A1 | 1/2014 | Younes et al. |
| 2018/0274347 A1 | 9/2018 | Ricotta |
| 2019/0048701 A1* | 2/2019 | Moore ............... C02F 1/58 |

OTHER PUBLICATIONS

Written Opinion mailed in PCT/US2021/052622 dated Jan. 11, 2022 (7 pages).

* cited by examiner

| Data Item | Type | Typical Units | Time frame of variability | Data Sources |
|---|---|---|---|---|
| Gas cost | Current value | $ per cubic foot | Multi-year to daily | Contracted price; spot price feed |
| Electricity Price | Current value | $ per kWh | Time of day, spot price | Power purchase agreement schedule; demand response event |
| Price received for water disposal | Current value | $ per barrel | Multi-year to monthly | Contracted price; current market price |
| Price received for recycled water | Current value | $ per barrel | Multi-year to monthly | Contracted price; current market price |
| Incremental gas generator capacity | Current value | kW | real-time | local sensor input |
| Battery storage capacity | Current value | kWh | real-time | local sensor input |
| Gas cost | Current value | kW, TH | real-time | local sensor input or manually input value |
| Crypto mining hardware efficiency level | Current value | % of peak | real-time | local sensor input or manually input value |
|  |  | $ per kWh/TH | real-time | external data feed or chosen value (preference based on expected value) |
| Crypto currency mining profitability | Current value | barrels | real-time | local sensor input |
| Produced water on hand | Current value | barrels | real-time | local sensor input |
| Recycled water storage capacity | Current value | bbl/cu ft gas | real-time | calculated from data |
| Water reduction efficiency | Derived factor | BTU | real-time | calculated from data |
| Incremental waste heat produced | Derived factor | bbl/BTU | real-time | calculated from data |
| Efficiency of water reduction from waste heat | Derived factor |  |  |  |

FIG. 7

SYSTEMS AND METHODS FOR INTEGRATED MANAGEMENT OF ASSOCIATED GAS AND PRODUCED WATER AT OIL WELL EXTRACTION SITES

REFERENCE TO RELATED PATENT APPLICATION

The present application claims benefit of Provisional Application No. 63/085,688 filed on Sep. 30, 2020.

TECHNICAL FIELD

The subject matter described herein relates to systems and methods for integrated management of associated gas and produced water at oil well extraction sites.

BACKGROUND

Extraction of oil from shale and other geologic formations results in the production of large volumes of associated gas and produced water. Produced water (e.g., "flowback water") is water obtained as a by-product of oil and gas extraction from completed wells after fracking. It is typically a mix of completion and formation fluids, gases, and dissolved particles and is often highly salty and toxic—not suitable for human consumption. Therefore, it must be recycled or disposed of safely and in compliance with appropriate regulations. Managing these substances accounts for a significant portion of lease operating expense or per barrel lift cost. Moreover, the impact of handling and disposing these substances can have serious environmental impact.

The operators of many oil well sites flare associated gas as they do not have feeders into natural gas pipelines. Flaring results in both atmospheric emissions and the loss of a valuable resource. Flaring has accelerated with the advent of hydrologic fracturing and unconventional oil recovery technologies.

In many wells the volume of produced water substantially exceeds that of the oil itself. Produced water is highly saline and often contains both man-made and natural subsurface contaminates. Therefore, after it is separated from the hydrocarbons, this water must be handled via processing for reuse and/or disposed of. It may be disposed of by injecting it into deep geologic formations via wells that are specifically designed for that purpose. It may be treated and reused to hydraulically fracture another well, which helps to reduce the net water consumption for a well site. In other cases, it can be discharged into local watersheds if it is clean enough to satisfy regulatory standards. Practices vary between regions, depending on regulations, geologic conditions, and water availability.

Water use per well can range from 1.5 million gallons to over 15 million gallons. The amount of water used depends on the rock formation, the operator, whether the well is vertical or horizontal, and the number of portions of the well that are fractured. However, many oil and gas production operations are located in arid regions where water is a limited resource in short supply. An example is the oil producing shale basins in the Southwestern United States. Energy producers in these areas require water for drilling, hydraulic fracturing, and other production operations. Other uses for water include agriculture and industrial processes. Thus, the need for recycling of produced water has gained urgency as these demands have increased.

At many well sites, produced water is not suitable for reuse, or there is no demand for recovered water, and it must be disposed of in a manner that avoids release of toxins and contaminants into the local environment. Disposal adds significant expense to overall lift costs and can narrow economic returns to the operator or even make the well economically unviable.

Produced water disposal costs typically involve transport by pipeline or truck to specially designated wells and payment of fees for use of these facilities. Disposal or "injection" wells themselves are a limited resource and in some jurisdictions are nearing full capacity. In some locations, well sites are remote from disposal facilities and produced water takeoff pipelines are not practical, so that trucking of produced water is therefore very expensive. In addition, when transported by pipeline or truck, spillage of contaminated water has created environmental damage requiring costly remediation.

Oil well production sites require various inputs, including electricity and water. Electricity is needed to operate pumps, compression equipment, monitoring sensors and alarms, communications, lighting and other equipment. At many sites, grid connection is not available or subject to curtailment and diesel generators are employed to supply electric power. Water is required at production sites for injection into the well in order to assist in moving hydrocarbons to the surface. Provision of these electric power and water inputs can represent a significant expense in production operations.

To improve the overall efficiency of well operations, conserve scarce natural resources, and reduce the economic cost and environmental impact of gas flaring and produced water mitigation, more effective integrated management systems are needed at the production site.

SUMMARY

Systems and methods have been developed to reduce the cost and environmental impact of gas and water produced in the extraction of oil at producing well sites. The present system described herein is designed, for example, to provide both reduction of gas flaring and disposal of toxic produced water. Associated gas is recovered and used onsite for electricity generation and generator waste heat is captured for use in produced water evaporation. Simultaneously, the system utilizes the temperature differentials between oil-gas-water slurry, separated produced water, gas generator exhaust, and water evaporate to increase efficiencies in the overall processes of electricity generation, produced water evaporation, and water vapor condensation and recapture.

The present system, for example, allows the productive use of associated gas that would otherwise be flared, while reducing the requirement for transport of produced water away from oil and gas well sites. This provides electricity for use in well site operations and other co-located applications such as data processing, lowering energy production costs and reducing the environmental impacts associated with produced water transportation and disposal.

Furthermore, with demand for cryptocurrencies increasing, e.g., bitcoin, so has demand for the production or more accurately, mining of bitcoin. The mining of bitcoin consumes a lot of energy because it involves very high-powered computers working out complex mathematical equations through another cryptographic process. One aspect of the present system is designed to lessen the environmental impact of mining by reducing external energy usage, while reducing costs by utilizing gas that would otherwise be flared to be converted into electrical energy to ultimately power data processing servers used to mine cryptocurrency.

In part, this disclosure describes a system and method for recovery of associated gas and processing of produced water at or near a wellhead by deploying a gas to electricity generator, an apparatus for capturing waste heat from the generator for use in heating produced water, and an apparatus for use of associated gas for further heating the produced water to point of evaporation.

This disclosure describes a system and method for capturing radiated heat from a well site gas to electricity generator and utilizing this heat for reduction of produced water volumes.

This disclosure describes a well site heat sink system for production of condensed water from the water reduction system.

This disclosure describes a system and method for utilizing heat captured from a gas to electricity generator to raise the temperature of a flowing mixture of oil, gas and water or a mixture of oil and water so as to lower the viscosity of oil to facilitate its separation from water.

Further disclosed are methods for utilizing the stream of oil, associated gas, and produced water in a heat exchange circuit for reducing the temperature of gaseous water evaporate so as to cause condensation of the evaporate and allow more efficient recovery and recycling of water. The method further includes capturing the condensate in a collection system that allows recovery of water and its transfer to local holding tanks or ponds from which it can be shipped away or reused in local well site operations or other local uses.

Further disclosed is a method and system for dynamically adjusting the level of various inputs in the invention. The value of this method and system will be appreciated when considering the variability of volumes of associated gas and produced water in oil extraction at the wellhead. Most oil wells experience a reduction in the level of associated gas, also referred to as a decline curve, during their operating life. Simultaneously, in many wells there is a change in the ratio of the volume of produced water to oil. In some geologic formations, such as the Permian Basin of the Southwestern US, the water to oil ratio may change from two barrels of water per barrel of oil at the start of production to ten or more barrels of water per barrel of oil near the end of production operations. Thus, during the operating life of well it is likely that the absolute volumes of association gas and produced water, as well as the relative amounts of associated gas and produced water, will significantly change.

One aspect of the present invention is the ability to dynamically adjust the routing of associated gas between electricity generation and produced water reduction. This capability provides flexibility to maintain efficiency of resource use over time as well as the ability to adjust to short-term fluctuations in inputs or interruptions in consumption due to equipment failures or maintenance-related down time.

Many oil and gas production operations are located in arid regions where water is a limited resource in short supply. An example is the oil producing shale basins in the Southwestern United States. Energy producers in these areas require water for drilling, hydraulic fracturing, and production operations. Other uses for water include agriculture and industrial processes. Recycling of produced water has gained urgency as these demands have increased.

It will be appreciated that deployment of the invention at a well site, which may be remote from services or infrastructure, brings economies that reduce the costs associated with multiple aspects of production operations. By integrating the subsystems for oil, gas and water handling and management in a novel manner, heretofore-unavailable efficiencies are made available. Moreover, otherwise wasted resources are recovered and additional sources of value are created from capture of lost energy and recycling of resources.

In one embodiment, a system for recovery of associated gas and processing of produced water at or near a wellhead comprises an associated structure (e.g., piping, valves and meters) configured to deliver natural gas at a wellhead site or gathering facility where the gas pressure is regulated and a gas conditioning system has removed unwanted contaminants in the gas; an associated structure (e.g., piping, flow and pressure sensors, and valves) for direction of excess gas to an emergency flare or other system to safely burn such excess gas if and when it is present; one or more gas powered electricity generators and associated electrical control system for delivering the produced electricity to on site uses; a receiving tank (receiving produced water that has been separated from hydrocarbons (oil and associated gas)); an associated structure (e.g., holding vessels, heat exchangers, and combustion elements) for heating the contents of said tank containing produced water to the point of evaporation; and an associated structure (e.g., conduits and recirculating coolant and heat exchangers) for capturing radiant heat from the generator casings or generator exhaust and transferring it to the heating means.

In some embodiments, the use of waste heat for heating and evaporation of produced water is accomplished by an associated structure (e.g., conduits and recirculating coolant and heat exchangers) for indirect heat transfer from generator jacket coolant. In some embodiments, the use of waste heat for heating and evaporation of produced water is accomplished by direct heat transfer from generator exhaust to produced water. In some embodiments, heating and evaporation of produced water is accomplished by direct heat transfer through combustion of natural gas within a vessel containing produced water. In some embodiments, heating and evaporation of produced water is accomplished by indirect heat transfer by combustion of gas to heat surfaces such as metal plates or drums that are placed in contact with produced water.

The present system may incorporate any the aforementioned variety of heat transfer methods in produced water reduction. The choice of optimal heat transfer method will likely be determined by the type of gas to electricity generators employed, as for example, reciprocating engines will have more waste heat that can be captured via engine jacket coolant system in comparison to turbines, wherein a greater portion waste heat is released via exhaust.

In another embodiment, the system incorporates an apparatus for the containment of the evaporated water vapor, facilitation of condensation of the water vapor, and collection of the condensate. The condensation system may include the use of a vacuum draw of the vapor to increase evaporation efficiencies.

Furthermore, it will be appreciated that the volume of associated gas flowing from a producing oil well varies over time. Variations over a long time period are typically described as a "production decline curve." On shorter timescales of days, hours and even minutes, there can also be significant variation in gas flow volume. To prevent the necessity of flaring gas (or excess gas) when a surge in volume occurs, and the resultant emissions and wasted resource(s), real time management techniques are needed.

The present system provides for monitoring of gas flow variations and dynamic adjustment of processes that consume gas. Rates of gas consumption for these processes are managed in an integrated fashion to account for, e.g., cost and performance efficiencies.

In one embodiment, efficiency rate of gas to electric generators is changed to allow for the consumption of a higher volume of gas and a corresponding increase in electricity output, while the allocation of the higher level of electricity created is sent to either data processing (e.g., mining operation), battery storage, grid contribution, or other loads. Since it is a common practice to operate a gas to electric generator below its peak capacity to maximize its useful operating life, it will often be the case that the generator operating level can be increased.

Further, the data processing facility of the present system may have computing hardware that is idle much of the time, and has a lower performance per kWh, and relatively lower associated economic utility, but can be started during times of excess gas flow and electricity generation. An example of such equipment would be older generation cryptocurrency mining servers that produce a rate of 10 terahashes per kilowatt in contrast to second generation servers producing 20 terahashes per kilowatt or advanced servers producing over 33 terahashes per kilowatt. Another example of such equipment is data processing hardware performing compute-intensive tasks such as graphics rendering.

Further, the system can also send increased electrical output to the local energy grid, e.g., if a grid connection and power purchase agreement is in place. The decision whether to send to the grid versus other onsite uses can be determined based on a number of factors, including current energy grid purchase rate. For example, if the local grid purchase rate is 3.5 cents per kilowatt hour, while the earnings from cryptocurrency mining is currently $0.35 cents per terahash per hour and idle mining equipment produces 14 terahash using 1.3 kWh, a calculation may determine which of these routes is more economical.

The foregoing general description and the following detailed description are both exemplary and intended to provide further explanation of the subject matter as claimed.

BRIEF DESCRIPTION OF DRAWINGS

The accompanying drawings constitute a part of this specification and illustrate embodiments that, together with the specification, explain the subject matter.

FIG. 7 is a table of controller logic data inputs according to an embodiment.

DETAILED DESCRIPTION

The following detailed description is provided with reference to the figures. Exemplary embodiments are described to illustrate the disclosure, not to limit its scope, which is defined by the claims. Those of ordinary skill in the art will recognize a number of equivalent variations in the description that follows without departing from the scope and spirit of the disclosure.

Figure 1:
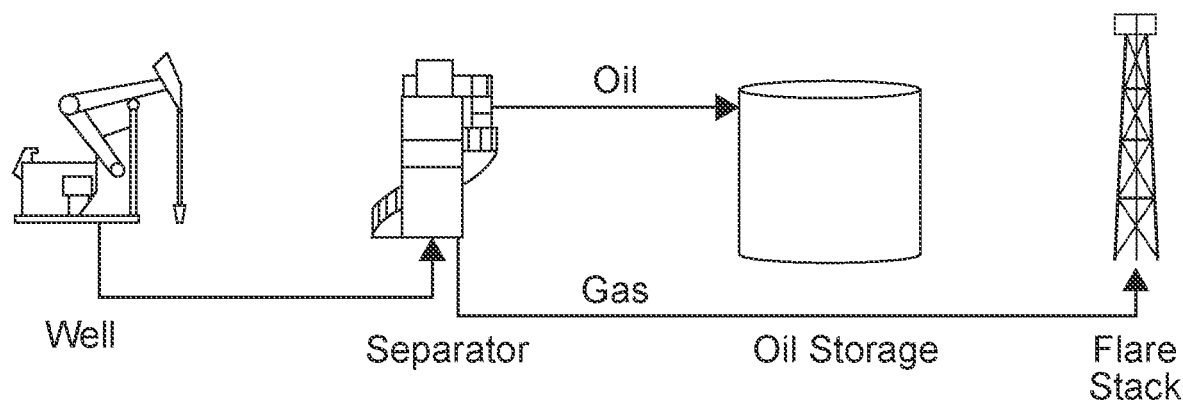
FIG. 1 illustrates a conventional oil well site layout.

FIG. 1 illustrates primary components of a conventional well site, namely production well (10), liquid-gas separation unit (12), oil storage unit (50), and flare stack (22).

Figure 2:
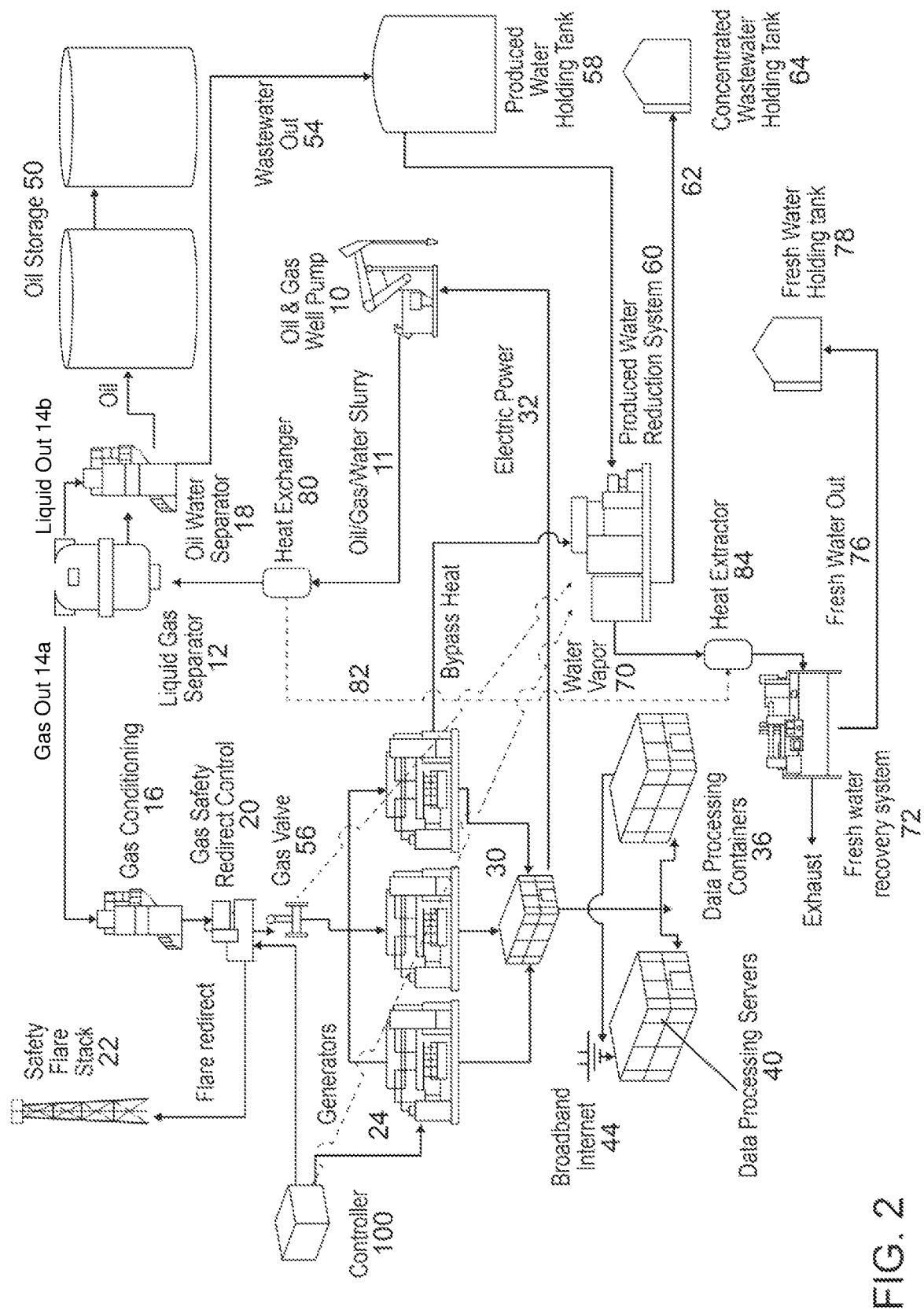
FIG. 2 illustrates a system for integrated management of associated gas and produced water, according to an embodiment.

FIG. 2 is an overall view of a system for integrated management of associated gas and produced water on site at a production well. One or more of the features of the system may be controlled, e.g., by a controller (100), which may operate in a local computing environment or remote computing environment, e.g., cloud-computing environment.

The production well (10) extracts a mixture of oil, gas, water and solids that is conveyed as a slurry via pipe (11) to liquid-gas separator unit (12). The liquid-gas separation unit (12) includes outputs for gas (14a) which is sent to a gas conditioning unit (GCU) (16) and liquids (14b) which are sent to an oil water separator (18). Conditioned gas is sent to one or more gas to electricity generators (24) or a flare stack (22). A gas safety redirect control (20) routes any gas that cannot be consumed by the generators (24) to the flare stack (22). In the event that a produced water reduction system (60) that operates from direct gas consumption is on site, the control (20) can route gas to the water reduction systems (60).

The generators (24) burn the gas and output electric current to an electricity substation (30) which performs current regulation and voltage transformation and routes electric current to data processing servers (40) typically housed within containers (36). The data processing servers (4) may be connected to the Internet (44), e.g., Broadband connection. Some amount of current (32) may also be supplied for use by the well pump (10) and/or other well operations.

In the present system, bypass heat from the generators (24) that would typically be lost into the atmosphere is captured in heat exchangers for use in a produced water reduction system (60). In one embodiment (not shown in FIG. 2), this exhaust gas is directed into a water evaporation vessel using a component or structure that directs exhaust at a depth to achieve the best results. Produced water is conveyed by a pipe (54) from the oil water separator (18) to a produced water holding tank (58). The produced water reduction system (60) draws water from the produced water holding tank (58) and utilizes waste bypass heat from the generators (24) to evaporate the produced water. The produced water reduction system may also directly utilize gas in combustion to contribute to the produced water evaporation process. In this case, at valve (56) (e.g., three-way valve) gas is routed directly to the produced water reduction system (60)

The produced water reduction system (60) outputs water vapor (70) and concentrated wastewater (62). The concentrated water (62) is routed to a concentrated water holding tank (64). The water vapor (70) is routed to freshwater recovery system (72) that collects water condensate and routes it via piping (76) to fresh water holding tank (78).

A heat exchange subsystem circulates fluid via piping (82) that runs between a heat exchange jacket (80) attached to the oil/gas/water slurry pipe (11) and a heat extractor (84) that is coupled to the water vapor outlet (70) of the produced water reduction system (60). Temperature of the slurry may be from 0 to 25 degrees Celsius or higher while the water vapor exiting the produced water reduction system may range from 90 to 180 degrees Celsius. This heat exchange subsystem utilizes the temperature differential to facilitate the lowering of the temperature of the water vapor exiting the produced water reduction system (60), which may increase efficiency in both rate of water reduction and water recovery.

It will be appreciated that the present system may incorporate a variety of known methods in transferring generator waste heat transfer to accomplish produced water reduction. These methods or equipment types include but are not limited to indirect heat transfer from generator jacket coolant, direct heat transfer from generator exhaust, direct heat transfer through combustion of natural gas within a vessel containing produced water, and indirect heat transfer by combustion of gas to heat surfaces such as metal plates or drums that are placed in contact with produced water.

Several of the elements described in the embodiment illustrated in FIG. 2 (e.g., produced water reduction system (60), produced water holding tank (58), concentrated wastewater holding tank (64), oil storage tanks (50), freshwater recovery system (72) may be positioned in relatively close proximity to a single well or a number of wells (e.g., that are located within a couple of miles from one another) such that the associated gas and produced water from the well(s) can be conveyed (e.g., pipes) to the (shared) elements.

Figure 3:
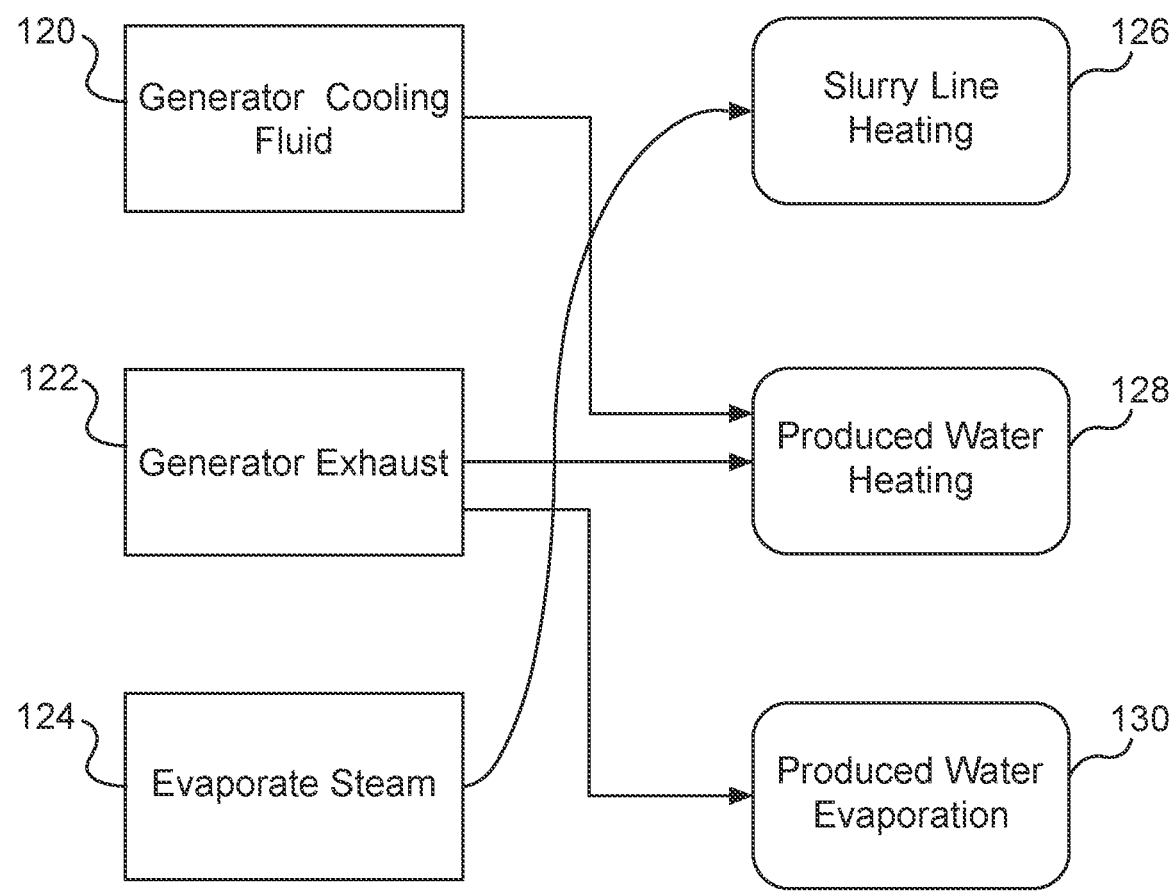
FIG. 3 is a flow diagram illustrating sources and uses of heat in an integrated system managing associated gas and produced water, according to an embodiment.

Referring to FIG. 3, the flow diagram illustrates a high level the sources and uses of heat energy in the present system. Heat absorbed into the generator cooling fluid (120) is used to raise the temperature of produced water so that less additional heating is required for the produced water to reach a boiling point (128). Heat absorbed into the generator exhaust (122) can be used to raise the temperature of produced water so that less additional heating is required for the produced water to reach a boiling point (128) and this exhaust heat can also be directly routed into the produced water to raise the water to boil (130). Finally, water vapor from the boiled water (124) contains heat that can be used to raise the temperature in the liquid slurry of oil, gas, and water that has emerged from the well bore to reduce the further heating required to facilitate the oil and water separation process (126).

Figure 4:
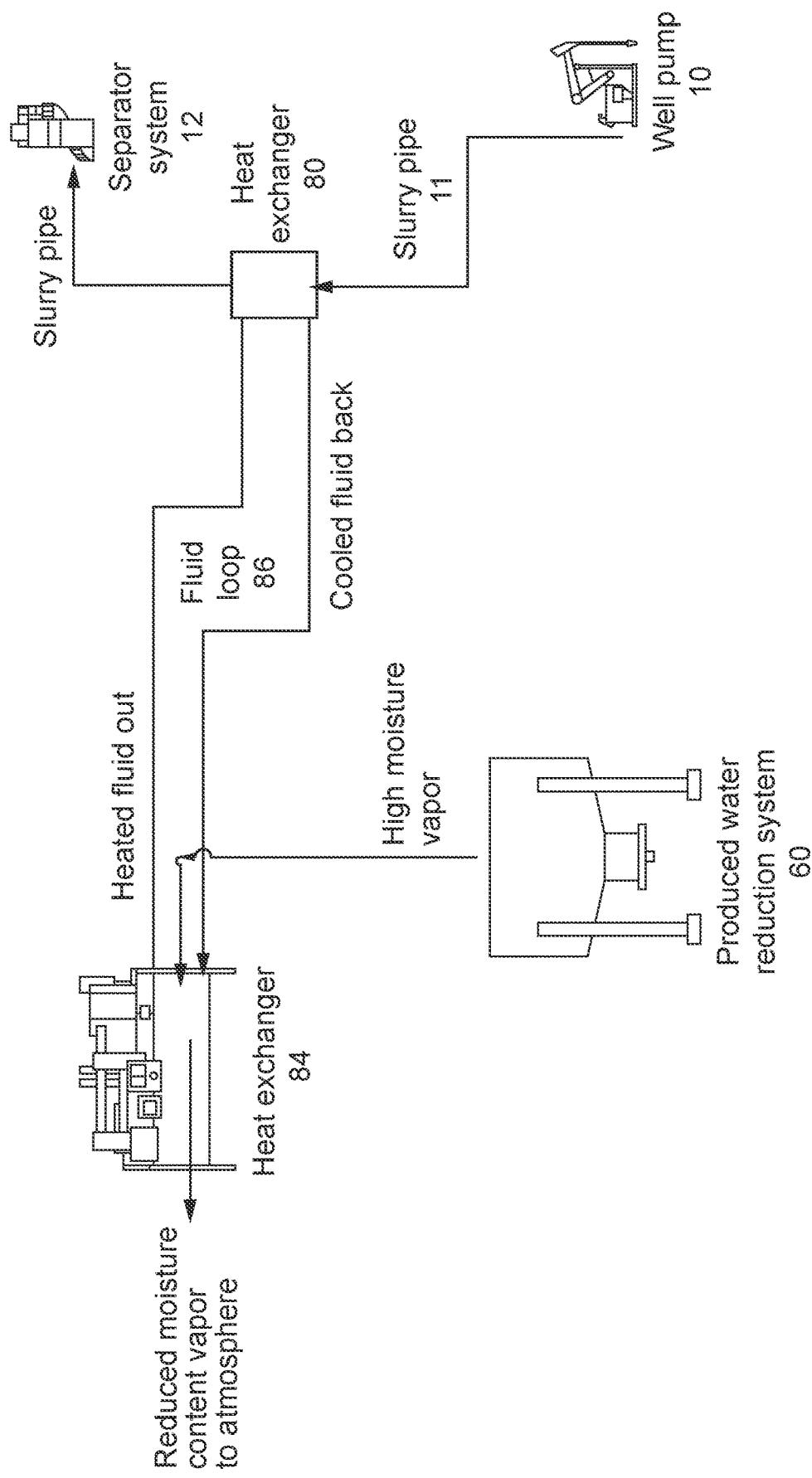
FIG. 4 illustrates a view of one embodiment of a subsystem for heat exchange within the system illustrated in FIG. 2.

Referring to FIG. 4, the diagram illustrates a subsystem, within the overall system illustrated in FIG. 2, whereby evaporate water heat is captured via a heat exchanger (84) which acts as a heat sink to absorb heat from evaporate water produced by the produced water reduction system (60) and conveyed by a fluid loop 86 to a heat exchanger (80) configured to increase the temperature of a slurry of oil, gas, and water moving through a slurry pipe (11). For example, this system is configured to extract fresh condensed water from high moisture vapor coming from produced water reduction system (60). The heat exchange units may take the form of conventional heat exchanger jackets utilizing an annular space to contain heat transfer fluid or other construction utilizing varied configurations of vessels and coils.

Figure 5:
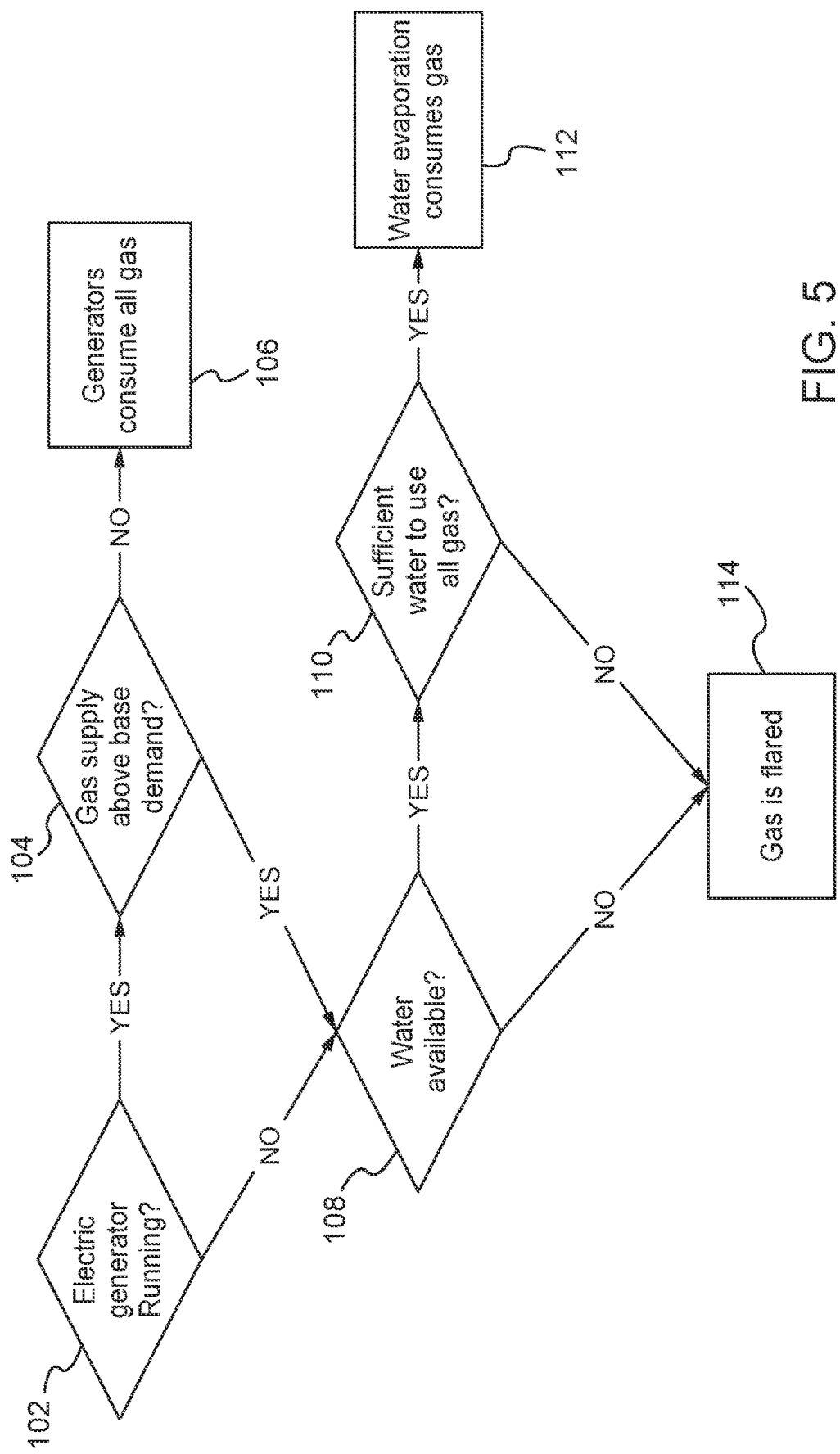
FIG. 5 illustrates a decision algorithm for dynamically adjusting the local routing of natural gas, according to an embodiment.

Referring to FIG. 5, the flow diagram illustrates one example of how the present system is configured to accommodate changing production conditions, and planned or unplanned equipment-related events, at the well site. During normal operation, generators are in operation (102) and designed to consume all of the associated gas produced (106). For example, for a typical reciprocating engine generator, this would represent approximately 240 MCF per day per megawatt of electricity generated and for typically producing wells during the initial years of operation this may range from 200 to 5000 MCF per day. One of ordinary skill in the art would understand that this range will vary depending on the individual well production rate and number of horizontal leads (e.g., 2-8 leads) extending from the well for fracking.

If the generators (24) go offline or become unable to consume all of the available gas (104), then the unconsumed gas is routed to the produced water reduction system (60). If sufficient water is available that water reduction can consume all of the available gas (110), then any gas not being consumed for electricity generation is used for produced water reduction (112). If the produced water holding tank (58) does not contain sufficient produced water for the produced water reduction system (60) to consume all the available produced water (108), then unconsumed gas is routed to the flare stack (114) or a storage tank (not shown for later use or disposal). The amount of produced water reduction sufficient to consume available gas will vary with the specific evaporation process utilized and might typically fall within a range of 0.07 to 0.14 barrels of water per MCF per hour of gas available. To the extent that the volume of produced water being heated and or evaporated by gas consumption at any time is increased, the volume of waste of gas routed to flaring is reduced. This automatic routing, for example, prevents or minimizes the flaring of gas and associated environmental impact.

It will be appreciated that the present system improves the efficiency of resource use in multiple ways. Typical gas to electricity generators utilize approximately 30-35% of BTU value of the gas consumed. In the present system, the majority of wasted energy can be utilized to (i) reduce the volume of produced water disposal and (ii) recycle a significant portion of the produced water into a useable condition.

Further, the incorporation of a heat exchange subsystem (80) between the well slurry pipe and the water evaporate increases overall system efficiency in two aspects. First, reduction of temperature in the water evaporate increases the efficiency of water condensation and recycling. Second, the increase of the temperature of the slurry reduces the energy required within the oil-water separator unit wherein the mixture is heated to increase oil viscosity to facilitate gravitational separation. In a typical deployment, for example, the slurry temperature might be increased from a range of 5 to 25 degrees Celsius to a range of 20 to 70 degrees Celsius.

By integrating several processes at a well site the present system provides multiple benefits, including less flaring of stranded gas, reduced environmental burden of produced water disposal, lower cost of produced water disposal, reduced energy consumption in oil-water separation, eliminates need for and cost of diesel generators for off-grid wells, lower cost electricity for use in data processing applications, and provides recycled water for use in well site or other applications.

By introducing produced water disposal into the present system, the effective cost per kilowatt hour of electricity produced by generators consuming associated gas can be reduced. Revenues or cost savings from produced water reduction and/or recycling can defray the cost of operation and capital amortization of such generators and associated equipment. This makes the use of electricity for local data processing more economically viable. Similarly, it makes the sale of the produced electricity to the grid or local customers more profitable.

The integrated management of excess gas flow described herein brings further advantages when produced water mitigation and/or recycling is available. The system incorporates sensors that determine the amount of produced water currently in holding tanks, the amount of unused holding capacity, the amount of recycled water storage or takeaway capacity and other amount of incremental unused capacity in water reduction subsystems. The system can determine based at least in part on the sensor data received by controller 100 whether all or a portion of gas flow or increased gas flow (e.g., surge) can be utilized directly to reduce gas, or alternatively, whether increasing generator output is desirable, e.g., to increase power sent to data processing servers 40 or to utilize resulting increase in waste heat for indirect produced water reduction 60.

The set of factors incorporated into such integrated management to allocate surges in gas volume and optimize economic and operational results can include one or more, but is not limited to the following: cost per cubic foot of gas; price received per kWh of contributing electricity to the energy grid; earnings per kWh of utilizing cryptocurrency mining or other data processing equipment; availability of excess gas to electric generator capacity; availability of battery storage capacity; availability of produced water in holding tanks waiting for processing; amount of waste heat produced by gas to electric generators; price per barrel of produced water disposal; price per barrel of recycled water; efficiency of produced water conversion using waste heat; and availability of incremental produced water reduction equipment capacity using direct consumption of gas. The system receives data for each of these factors that is used to optimize economic and operational results from one or more of the following sources: external data provider, predefined values set by user, and/or data received from sensors integrated into the system. As described below, the system utilizes this data along with derived calculations to make decisions for allocation of gas and any incremental electricity to be generated.

Figure 6:
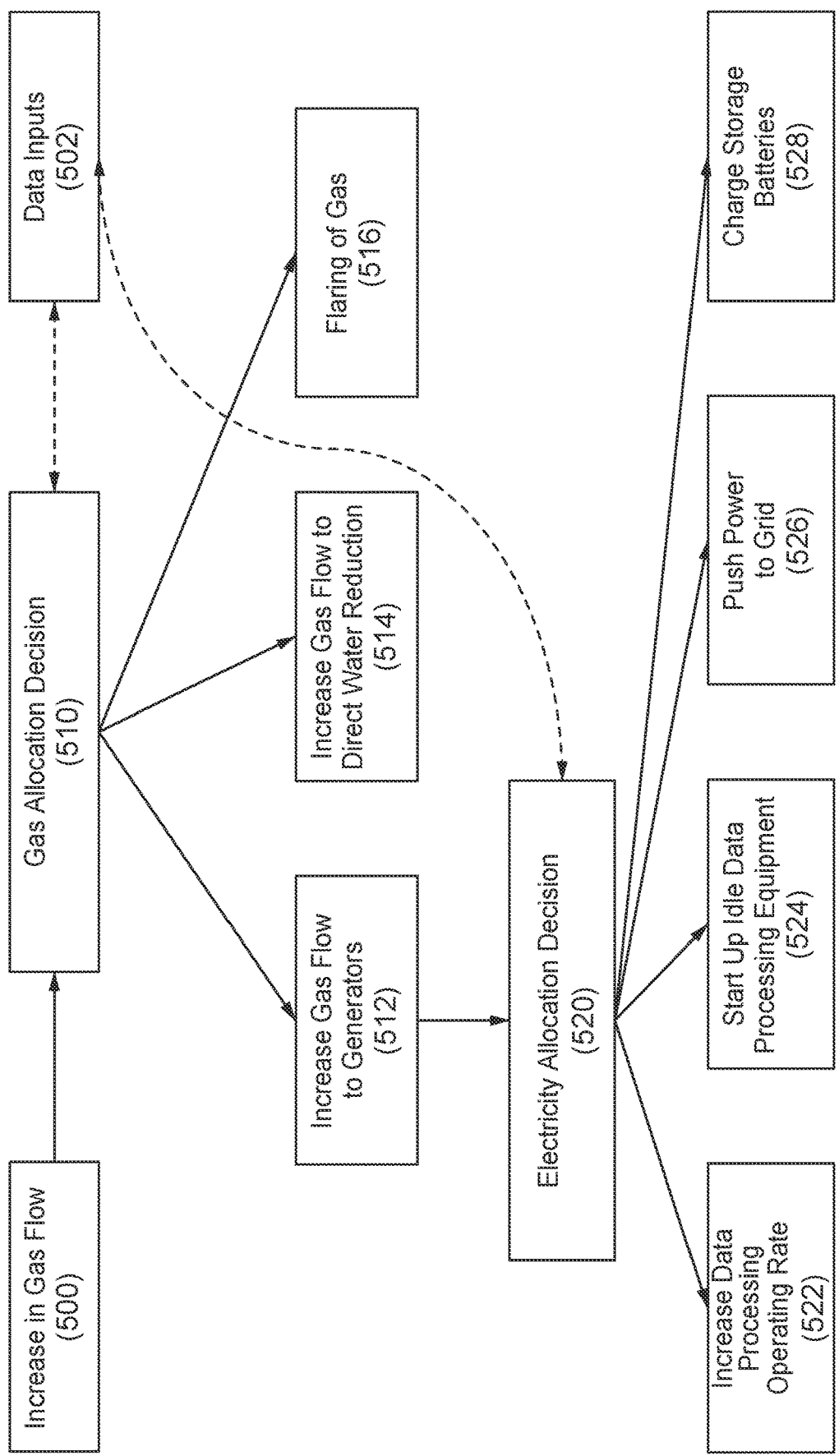
FIG. 6 is a flowchart illustrating, according to one embodiment, operational decisions made by an excess gas flow management algorithm and produced water management algorithm implemented by a controller.

FIG. 6 is a flowchart illustrating, according to one embodiment, operational decisions made according to an excess gas flow management algorithm and produced water management algorithm implemented by controller 100 which may be integrated into the present system.

According to this embodiment, when controller 100 determines that there is a change or increase in gas flow 500, e.g., abnormality, such as spike, prolonged elevated level, gas flow detected outside of previous period variation, etc., then the controller 100 acts to manage such increase or variation in gas flow, based in part on one or more data inputs 502.

FIG. 7 is a table showing non-limiting example of various data inputs 502 that could be used by the controller 100 for making gas allocation decisions 510. The sources of data may include, for example, local sensor input, manual input values, external data sources (e.g., data feed of current market prices), policies, contracts, or calculated and predicted values.

The controller 100 is configured to make a gas allocation decision, for example, (a) to increase gas flow to generators 512, (b) to increase gas flow to direct water reduction 514, and/or (c) to increase flaring of excess gas 516.

One or more of the data inputs and/or calculations made by the controller 100 may be used to determine the level of electricity 520, which results from the increased gas flow to the generator, that is allocated to desired operations. For example, the desired operations could be one or more of following: increase data processing equipment operating rate 522 startup/power idle data processing equipment 524, push power to electricity grid 526, and charge storage batteries 528.

The controller 100 may be configured to execute an artificial intelligence model to process the various inputs and determine actions to be taken by the system.

Non-Limiting Examples

In one example, an installation might consist of four gas to electricity generators each rated to provide 1.3 Megawatt continuous output or a total of 5.2 Megawatts. Assuming a gas consumption of 250 MCF per MW per day in gas flow (or 10.4 MCF per MW per hour), the generators might typically be consuming 910 MCF of gas per day or 37.9 MCF per hour while operating at 70% of capacity to produce 3.64 MW or 0.91 Megawatts apiece.

In this example, it is a summer afternoon with an outside temperature of 88 degrees Fahrenheit and all the power output is being consumed by local data processing equipment. In the event of a significant increase in the flow of gas, for example to 45.5 MCF per hour, the controller might determine to utilize all the increased gas to increase the generator operating level to 4.37 MW or 1.09 MW apiece, or 84% of rated output. The controller will then decide how to allocate the increased electricity output.

In this scenario, it is not desirable to increase the operating level of the data processing units since ambient temperature is already high, while the time of day falls within the higher utility demand window with the highest rate paid for contribution of electricity to the grid. Thus, the entire increase in electric output of 0.72 MW might be allocated to grid contribution.

In another example, the increase in gas flow occurs during nighttime hours, and increased electric output might be allocated as follows: 0.36 MW to increasing the operating rate of the data processing equipment by 10%, and 0.36 MW toward grid contribution.

In either scenario, the increase in waste heat from increased generator levels can be utilized to increase reduction for produced water.

In a third example, direct reduction of produced water by gas consumption is available. In the summer afternoon conditions, if a sufficient volume of produced water is available in holding tanks, then a portion of the increased gas might be directed to water reduction, since the amount of energy required to evaporate water makes this economically attractive relative to the revenue obtained by grid contribution. Such allocation decisions might also be affected by other factors such as current price for water disposal or recycled water, price for grid contribution, and current profitability of data processing.

As described above, by operating the system of gas consumption and electricity production and consumption in an integrated fashion, the benefits of flaring prevention, resource conversation, and more efficient economic operations can be balanced and optimized to a degree not previously attainable.

The above embodiments may be controlled by an electronic control circuit (e.g., controller), or system. The control circuit may optionally be networked to another computing system via a network, such as the Internet or a local area network (LAN) although network and computing system need not be part of the control circuit. The control circuit can include a CPU, memory, communications unit, display, all connected via a bus. It is noted that one or more control circuits can be used to implement various aspects of certain embodiments of the disclosure.

The control circuit can be implemented by various forms of digital computers, such as laptops, desktops, workstations, servers, blade servers, mainframes, and other appropriate computers. The components, their connections and relationships, and their functions, are meant to be examples only, and are not meant to limit embodiments of the disclosure described and/or claimed in this document.

Additionally, the control circuit may obtain various data from the system via sensors or other monitoring equipment, e.g., thermocouples, pressure monitors, and volumetric flow meters.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A system for integrated management of associated gas and produced water at oil well extraction sites, comprising:
   a well configured to extract a mixture of oil, gas, water, and solids;
   a slurry pipe configured to convey the mixture to a liquid-gas separator;
   an electricity generator configured to burn a conditioned gas and output electric current;
   wherein the liquid-gas separator comprises:
      an output for gas, separated from the mixture, to be sent to a gas conditioner unit, wherein conditioned gas is output from the gas conditioning unit;
      an output for liquids, separated from the mixture, to be sent to a produced water holding tank;
   a gas safety redirect control configured to direct the conditioned gas to a gas control valve and/or a flare stack;
   the gas control valve is configured to direct the conditioned gas to the generator;
   a produced water reduction system configured to draw water from the produced water holding tank and utilize heat generated by exhaust gas output from the generator to evaporate the produced water in a water evaporation vessel, wherein the produced water reduction system is designed to separately output water vapor and concentrated wastewater; and
   a plurality of data processing servers configured to utilize the electric current output from the generator.

2. The system of claim 1, further comprising:
   a controller configured to control the gas control valve,
   wherein if there is an increase in conditioned gas to the gas control valve the controller makes a gas allocation determination based on a first plurality of inputs;
   wherein, based on the gas allocation determination, the gas control valve is controlled to direct the conditioned gas to (i) the flare stack, and/or (ii) the generator;
   wherein, if the gas control valve is controlled to increase an amount of conditioned gas directed to the generator, the controller is configured to make an electricity allocation determination based on a second plurality of inputs;
   wherein, based on the electricity allocation determination, the controller is configured to direct the system to (i) increase a data processing operating rate on a data processing server, (ii) start up idle data processing equipment, (iii) direct generated electric current to a power grid, and/or (iv) charge a storage battery.

3. The system of claim 2, wherein the data processing server is configured to mine cryptocurrency.

4. The system of claim 1, wherein the gas control valve is additionally configured to direct the conditioned gas to the produced water reduction system to evaporate the produced water.

5. The system of claim 4, further comprising:
   a controller configured to control the gas control valve,
   wherein if there is an increase in conditioned gas to the gas control valve the controller makes a gas allocation determination based on a first plurality of inputs;
   wherein, based on the gas allocation determination, the gas control valve is controlled to direct the conditioned gas to (i) the flare stack, (ii) the produced water reduction system, and/or (iii) the generator;
   wherein, if the gas control valve is controlled to increase an amount of conditioned gas directed to the generator, the controller is configured to make an electricity allocation determination based on a second plurality of inputs;
   wherein, based on the electricity allocation determination, the controller is configured to direct the system to (i) increase a data processing operating rate on a data processing server, (ii) start up idle data processing equipment, (iii) direct generated electric current to a power grid, and/or (iv) charge a storage battery.

6. The system of claim 5, wherein the controller is configured to dynamically adjust the routing of the conditioned gas between electricity generation and produced water reduction.

7. The system of claim 1, further comprising
   a freshwater recovery system configured to (i) collect the water vapor output from the produced water reduction system, (ii) collect water condensate from the collected water vapor, and (iii) direct the collected water condensate to a fresh water holding tank.

8. The system of claim 1, further comprising:
   a heat exchange subsystem positioned between the slurry pipe and the water vapor output, wherein the heat exchange subsystem is configured to increase efficiency of water condensation and recycling.

9. The system of claim 1, further comprising:
   a heat exchange subsystem positioned between the slurry pipe and the water vapor output, wherein the heat exchange subsystem is configured to increase a temperature of the mixture, and the increased temperature of the mixture reduces energy required within the liquid-gas separator.

10. The system of claim 9, wherein a temperature of the mixture is 20-70 degrees Celsius.

11. The system of claim 1, wherein an amount of heat generated by exhaust gas output from the generator is proportional to the amount of electricity being generated by the generator.

12. The system of claim 1, further comprising an electrical substation, wherein the electricity output from the generator is received at the electrical substation and directed to the data processing servers and/or to equipment involved in operation of the well.

13. The system of claim 1, wherein if the generator goes offline or is unable to consume all the available gas, then any unconsumed gas is routed to the produced water reduction system.

14. The system of claim 1, wherein an efficiency rate of the generator is changed to allow for consumption of a higher volume of the conditioned gas and a corresponding increase in electricity output from the generator.

15. A system for integrated management of associated gas and produced water at oil well extraction sites, comprising
a well configured to extract a mixture of oil, gas, water, and solids;
a slurry pipe configured to convey the mixture to a liquid-gas separator;
an electricity generator configured to burn a conditioned gas and output electric current;
wherein the liquid-gas separator comprises:
an output for gas, separated from the mixture, to be sent to a gas conditioner unit;
an output for liquids, separated from the mixture, to be sent to a produced water holding tank;
wherein the water, separated from the mixture and sent to the produced water holding tank, is directed to a water evaporation vessel;
a gas safety redirect configured to direct the conditioned gas to a gas control valve and/or a flare stack;
the gas control valve is configured to direct the conditioned gas to the generator or to a produced water reduction system;
a plurality of data processing servers configured to utilize the electric current output from the generator;
the produced water reduction system configured to draw water from the produced water holding tank, send the produced water to the water evaporation vessel, and utilize heat generated by exhaust gas output from the generator to evaporate the produced water, wherein the produced water reduction system is designed to separately output water and concentrated wastewater;
a fresh water recovery system configured to (i) collect the water vapor output from the produced water reduction system, (ii) collect water condensate from the collected water vapor, and (iii) direct the collected water condensate to a fresh water holding tank; and
a controller configured to control the gas control valve,
wherein if there is an increase in conditioned gas to the gas control valve the controller makes a gas allocation determination based on a first plurality of inputs;
wherein, based on the gas allocation determination, the gas control valve is controlled to direct the conditioned gas to (i) the flare stack, (ii) the produced water reduction system, and/or (iii) the generator;
wherein, if the gas control valve is controlled to increase an amount of conditioned gas directed to the generator, the controller is configured to make an electricity allocation determination based on a second plurality of inputs;
wherein, based on the electricity allocation determination, the controller is configured to direct the system to (i) increase a data processing operating rate on a data processing server, (ii) start up idle data processing equipment, (iii) direct generated electric current to a power grid, and/or (iv) charge a storage battery.

* * * * *